Patented Dec. 23, 1952

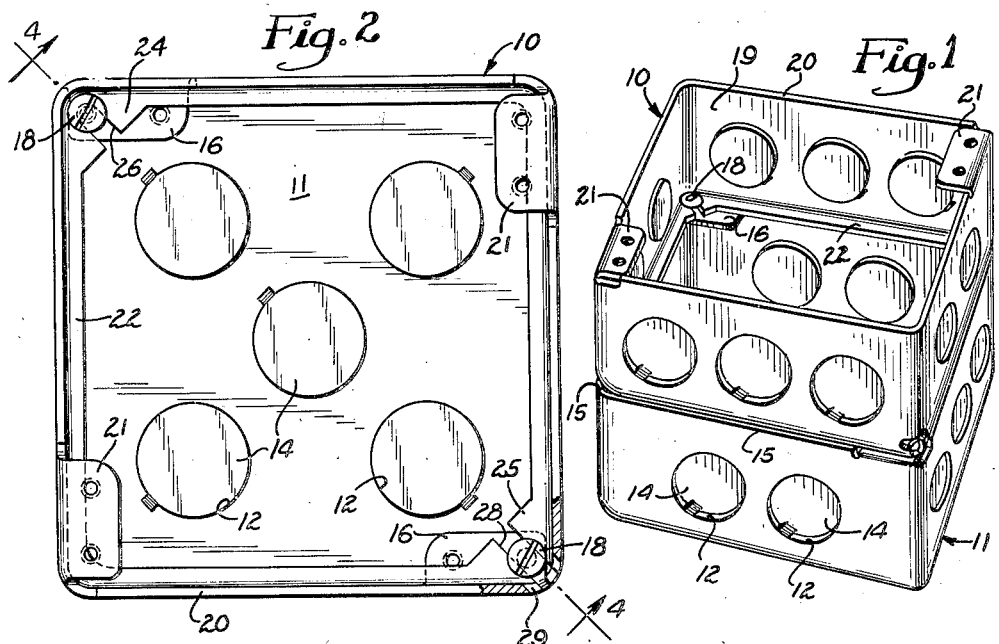
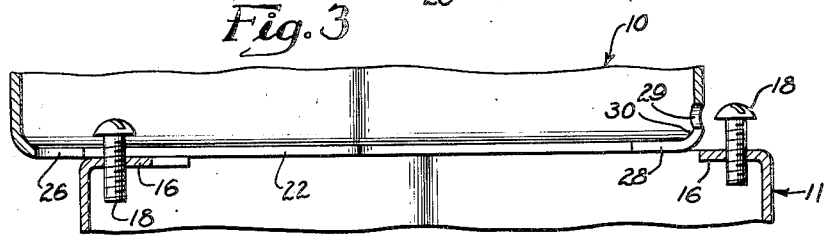
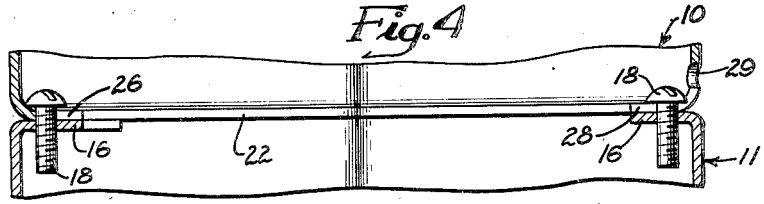
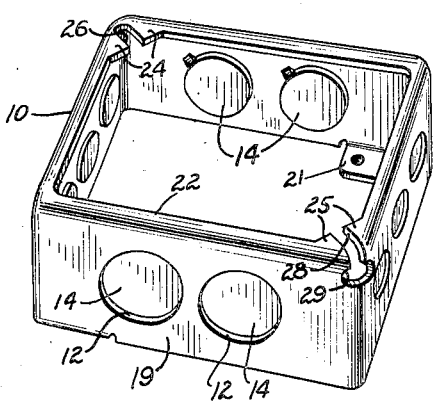

2,622,756

UNITED STATES PATENT OFFICE 2,622,756

BOX EXTENSION RING

Arthur I. Appleton, Northbrook, Ill.

Application October 6, 1950, Serial No. 188,748

4 Claims. (Cl. 220—3.94)

The present invention relates generally to the field of electrical boxes and fittings but more specifically to a novel extension ring for attachment to a junction box or the like to increase the depth of the same.

The principal object of the invention is to provide a box extension ring having a novel and improved means for securing the same to a junction box or the like.

Another object is to provide a box extension ring of simple, rugged construction and which will be susceptible of rapid installation and economical manufacture on a mass productive basis.

Other objects and advantages will become apparent as the following description proceeds, taken in the light of the accompanying drawing, wherein:

Figure 1 is a perspective view showing an illustrative box extension ring embodying the invention and mounted in position upon a conventional junction box.

Fig. 2 is a plan view of the illustrative ring and box shown in Fig. 1.

Figs. 3 and 4 are enlarged fragmentary vertical sectional views taken in the plane of the line 4—4 in Fig. 2 and illustrating sequentially the manner in which the extension ring is installed upon the junction box.

Fig. 5 is a perspective view detailing the bottom of the illustrative box extension ring shown in Fig. 1.

While the invention is susceptible of various modifications and alternative constructions, a preferred embodiment has been shown in the drawing and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawing, the invention is there shown embodied in an illustrative extension ring 10 adapted in the present instance for attachment to the open end of a junction box 11. The latter in this case happens to be of stamped or drawn sheet metal construction. Its side walls define substantially a square when viewed in plan and are provided with one or more knockout apertures 12 and their corresponding removable plugs 14. At diagonally opposite corners, the top edges 15 of the junction box 11 have integral therewith inturned lugs 16. These are drilled and tapped for the reception of mounting screws 18 normally used for attaching a cover to the box 11.

The extension ring 10 is polygonal in form and in the present instance corresponds in overall shape to the junction box 11 with which it is to be used. Thus the ring 10 comprises a side wall structure 19 terminating in a top edge 20 similar to the edge 15 of the box 11 and provided with a pair of diagonally opposed, inturned mounting lugs 21. The latter are similar to the lugs 16 of the junction box, being adapted to threadedly receive one or more cover mounting screws. At the bottom, the side wall structure 19 terminates in an inturned flange 22 which is preferably integral with the wall structure 19. The flange 22 has a curved external surface which seats readily upon upper edge 15 of the junction box wall and also upon the screw lugs 16 of the junction box.

Provision is made for effecting attachment of the ring 10 to the box 11 with security, ease and rapidity. In furtherance of such objective, the bottom flange 22 is fashioned with a pair of diametrically opposed corner webs 24, 25, spaced alternately with the inturned mounting lugs 21. The corner webs 24, 25 are respectively provided with alined and diagonally extending screw slots 26, 28, each of appropriate width to accommodate the shank of a mounting screw 18. The slot 26 terminates in its corresponding corner web 24. The slot 28, however, extends completely through its corner web 25 and terminates in a laterally enlarged extension 29 located up in the side wall structure 19 of the ring 10. As clearly indicated in Figs. 3, 4 and 5, such construction defines a pair of integral lugs 30 spaced the width of the slot 28 and upstanding above the general plane of the flange 22.

The manner in which the ring 10 may be attached to the box 11 will be readily understood upon reference to Figs. 2, 3 and 4. Assuming the mounting screws 18 of the box 11 to be in approximate mid-position on the lugs 16, the first step in installation of the ring 10 is to place it on the upper edge of the box 11 in offset relation with the same and with the diagonal axis of the screw slots 26, 28 in alinement with the box diagonal running between the screws 18. As a result of contact between the corner webs 24, 25 and the lugs 16, as well as contact between the upper edge 15 of the box and points on the underside of the ring 10 at the corners remote from the corner webs, the ring 10 is maintained level at this time. The next step in installation involves moving the ring 10 along the diagonal axis of the slots 26, 28 from the position indicated in Fig. 3 to the position indicated in Figs. 2 and 4. This results in seating the ring 10 in centered and overlying relation with respect to the box 11. Moreover, without tightening either of the screws 18, the ring 10 is confined against movement in any direction other than along the diagonal axis of the slots 26, 28. As soon as the screw 18 adjacent the slot 28 (shown in lower right-hand corner of Fig. 2 and right-hand end of Figs. 3 and 4) is tightened below the restraining lugs 30, the ring 10 becomes positively attached to the box 11. To make the attachment completely secure, the screws 18 are, of course, tightened in the lugs 16 until their heads accost the respective underlying portions of the corner webs 24, 25.

Upon reflection, it will be noted that the structure described herein not only permits rapid installation of the extension ring 10, but, in addition, provides a very positive and foolproof attaching arrangement. Once the ring 10 is slid into centered position on the box 11, the ring can be locked in place with very little tightening of the screws 18. Even if the screws 18 should loosen up slightly, the ring 10 cannot slide out of position due to the locking action of the restraining lugs 30 and the adjacent one of the screws 18.

I claim as my invention:

1. As an article of manufacture, a box extension ring comprising the combination of a polygonal side wall structure having one or more knockout apertures therein, a base flange integral with said wall structure, a pair of corner webs integral with said base flange and situated at diagonally opposite corners on said ring, each of said corner webs having a screw slot running in the direction of the diametrical axis of said webs, each said screw slot being adapted to constrain said ring against movement in directions other than along said diametrical axis, one of said slots having a laterally enlarged extension projecting into the side wall structure of said ring.

2. As an article of manufacture, an extension ring for attachment to an electrical junction box with its sides in substantially coplanar relation with those of the box, said ring comprising the combination of a polygonal side wall structure having one or more knockout apertures therein, an inturned base flange fixed to said wall structure, said base flange having a pair of alined screw slots coaxial with one of the diagonals of said side wall structure and located in diametrically opposed corner regions of said ring, one of said slots terminating in a laterally enlarged extension projecting into the side wall structure of said ring, said extension being of sufficient width to clear the head of a mounting screw.

3. An extension ring for attachment to electrical junction boxes and the like, said ring comprising the combination of a rectangular side wall structure having knockout apertures therein, said side wall structure terminating at the top in a pair of cover mounting screw lugs, said side wall structure terminating at the bottom in an inturned ledge at the base of said ring, web portions of substantially triangular form integral with said ledge and located at diagonally opposite corners of said ring, each of said web portions having a diagonally extending screw slot, one of said screw slots extending into the angular corner of said side wall structure and terminating in a laterally enlarged portion of generally circular shape for clearing the mounting screw of a junction box as said ring is slid into position thereon.

4. An extension ring for electrical junction boxes and the like, said ring comprising, in combination, a side wall structure, an inturned base flange fixed to said side wall structure, said flange being formed with a pair of diagonally alined slots, one of said slots terminating short of said side wall structure, the other of said slots extending upward along one corner of said side wall structure and terminating in a laterally enlarged portion in said side wall structure, the upward extending portion of said other slot having edges disposed adjacent said laterally enlarged portion, said edges constituting restraining lugs adapted to accost the head of a mounting screw when the same is substantially against said flange and thereby to preclude detachment of said ring from the junction box.

ARTHUR I. APPLETON.

REFERENCES CITED

The following references are of record in the file of this patent:

UNITED STATES PATENTS

| Number | Name | Date |
| --- | --- | --- |
| 946,646 | Pratt | Jan. 18, 1910 |
| 1,228,731 | Abbott et al. | June 5, 1917 |
| 1,862,811 | Strong | June 14, 1932 |
| 2,378,861 | Peevey | June 19, 1945 |